United States Patent
Di Luca et al.

(10) Patent No.: US 11,030,865 B1
(45) Date of Patent: Jun. 8, 2021

(54) SYSTEMS AND METHODS FOR DELIVERING A PLURALITY OF HAPTIC EFFECTS

(71) Applicant: Facebook Technologies, LLC, Menlo Park, CA (US)

(72) Inventors: Massimiliano Di Luca, Redmond, WA (US); Tianshu Liu, Redmond, WA (US); Ali Israr, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/714,245

(22) Filed: Dec. 13, 2019

(51) Int. Cl.
*H04B 3/36* (2006.01)
*G08B 6/00* (2006.01)
*G06F 3/01* (2006.01)

(52) U.S. Cl.
CPC ............... *G08B 6/00* (2013.01); *G06F 3/016* (2013.01)

(58) Field of Classification Search
CPC .......... G08B 6/00; G06F 3/016; G06F 3/014; H01H 2003/008; A61B 2018/00297
See application file for complete search history.

(56) References Cited

U.S. PATENT DOCUMENTS

| | | | |
|---|---|---|---|
| 10,115,274 B1 * | 10/2018 | Mandeville | H01Q 1/225 |
| 10,684,690 B2 * | 6/2020 | Keller | G06F 3/012 |
| 2016/0274662 A1 * | 9/2016 | Rimon | G06F 3/016 |
| 2017/0011602 A1 * | 1/2017 | Brav | G06K 9/00013 |

OTHER PUBLICATIONS

Foehr, A. et al. "Spiral-based phononic plates: From wave beaming to topological insulators," Physical Review Letters 120, 205501 (2018), 9 pages.
Zangeneh-Nejad, F. et al., "Acoustic Analogues of High-Index Optical Waveguide Devices," Scientific Reports, vol. 8, No. 1, (2018) 12 pages.

* cited by examiner

*Primary Examiner* — Toan N Pham
(74) *Attorney, Agent, or Firm* — Foley & Lardner LLP (57) ABSTRACT

A haptic device including an active element and a plurality of passive elements coupled to the active element. Each passive element has a respective response to a wave transmitted by the active element, and is configured to cause a respective haptic effect at a respective location away from the active element. In some embodiments, the respective response includes resonating when energy having a resonant frequency is received. In some embodiments, the wave transmitted by the active element is in the form of a vibration or acoustic energy.

20 Claims, 6 Drawing Sheets

SYSTEMS AND METHODS FOR DELIVERING A PLURALITY OF HAPTIC EFFECTS

FIELD OF THE DISCLOSURE

The present disclosure relates generally to a haptic system. More particularly, the present disclosure relates to systems and methods for delivering haptic stimulation using light weight devices.

BACKGROUND

The present disclosure relates generally to haptic systems. Haptic systems or devices may be utilized in a variety of electronic devices. For example, a haptic system or device may be utilized to provide a user of a virtual reality (VR), augmented reality (AR), or mixed reality (MR) system with tactile feedback based on the state of the system. For example, a haptic device may be utilized to provide a user with tactile feedback based on the user's input. The haptic device provides a user with more in depth stimulation that may not otherwise be provided.

SUMMARY

One implementation of the present disclosure is related to a haptic device, according to some embodiments. The haptic device may include an active element and a plurality of passive elements each coupled to the active element. Each passive element has a respective response to a wave transmitted by the active element and is configured to cause a respective haptic effect at a respective location away from the active element. In some embodiments, the respective response is a resonant frequency. In some embodiments, when the active actuator transmits the wave at one of the resonant frequencies of the passive elements, the associated passive element is configured to vibrate more than other of the passive elements. In some embodiments, the haptic device includes a waveguide that is configured to deliver the wave to the passive elements without interfering with the haptic effect. In some embodiments, each passive element is further configured in a respective orientation for providing the respective haptic effect. In some embodiments, the haptic device includes a wearable device, and the respective locations of the passive elements are configured to be respective locations of a person wearing the wearable device. In some embodiments, the wearable device includes a glove.

In another implementation, an apparatus includes an active element and a plurality of resonators coupled to the active element, each resonator having a respective resonant frequency. The active element is configured to transmit energy to the resonators at a selected one of each of the plurality of resonant frequencies. In some embodiments, the resonators each comprise a moving mass mounted on an elastic substrate. In some embodiments, in response to the energy having the resonant frequency, the elastic substrate of the associated resonator allows the moving mass to oscillate. In some embodiments, the resonators each further comprise a surface, and are configured such that when the moving mass oscillates, it makes contact with the surface. In some embodiments, the elastic substrate comprises a spring. In some embodiments, the resonators each further comprise an enclosure, and are configured such that when the moving mass oscillates, the enclosure vibrates. In some embodiments, the elastic substrate is attached to a grounding portion. In some embodiments, two of the resonators have the same respective resonant frequency, and wherein the two resonators are configured to vibrate in different directions in response to the energy having the same respective resonant frequency.

In another implementation, an apparatus includes an active element, a plurality of passive elements, and a waveguide for conducting energy from the active element to all the plurality of passive elements, wherein the active element is configured to selectively activate one or more of the plurality of passive elements via the waveguide by adjusting a parameter of the energy. In some embodiments, each of the passive elements has a respective resonant frequency, and wherein the parameter comprises a frequency of the energy. In some embodiments, the respective resonant frequency is configured to be modified using one or more of an electrical, mechanical, magnetically, or electromechanical system. In some embodiments, the energy comprises vibration. In some embodiments, the energy comprises acoustic energy.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Referring generally to the FIGURES, systems and methods for haptic systems are shown, according to some embodiments. In some embodiments, a haptic system includes an active element and multiple passive elements. In some embodiments, the passive elements are passive resonators that include a mass mounted on an elastic substrate such as a surface or a spring. Each of the passive elements may have a resonant frequency that is unique or different than the others. The passive elements may be electrically connected to the active element via a mechanical waveguide or other vibration conductive element. The active element is configured to generate and provide a wave or a signal (e.g., energy) at one or more frequencies that cause the passive elements to resonate and create a tactile sensation to a user at localized areas. In some embodiments, the energy generated and provided by the active element is a vibration of the haptic device. In some embodiments, the energy generated and provided by the active element is acoustic energy and/or ultrasound energy. In some embodiments, the energy generated and provided by the active element includes an electrical signal that is configured to be received by the one or more passive elements. In this way the haptic system may be implemented in light-weight applications because of the reduced amount of active elements needed to provide tactile sensations.

The active element and multiple passive elements may be arranged in a certain geometry in which the weight, size, or material of the passive elements are designed to cause certain haptic effects at respective locations away from the active element. In some embodiments, the haptic system may be implemented in various form factors. For example, the haptic system may be implemented in the form of a glove, bracelet, arm band, other wearable forms, or other forms that may be contactable with a user's skin. Further, the haptic system may be implemented or connectable to various electronic devices. For example, the haptic system may be implemented with a virtual reality (VR) system, augmented reality (AR) system, or mixed reality (MR) system. In some embodiments, the haptic system may be implemented with electronic devices such as game consoles, personal computers, or gaming systems.

Figure 1:
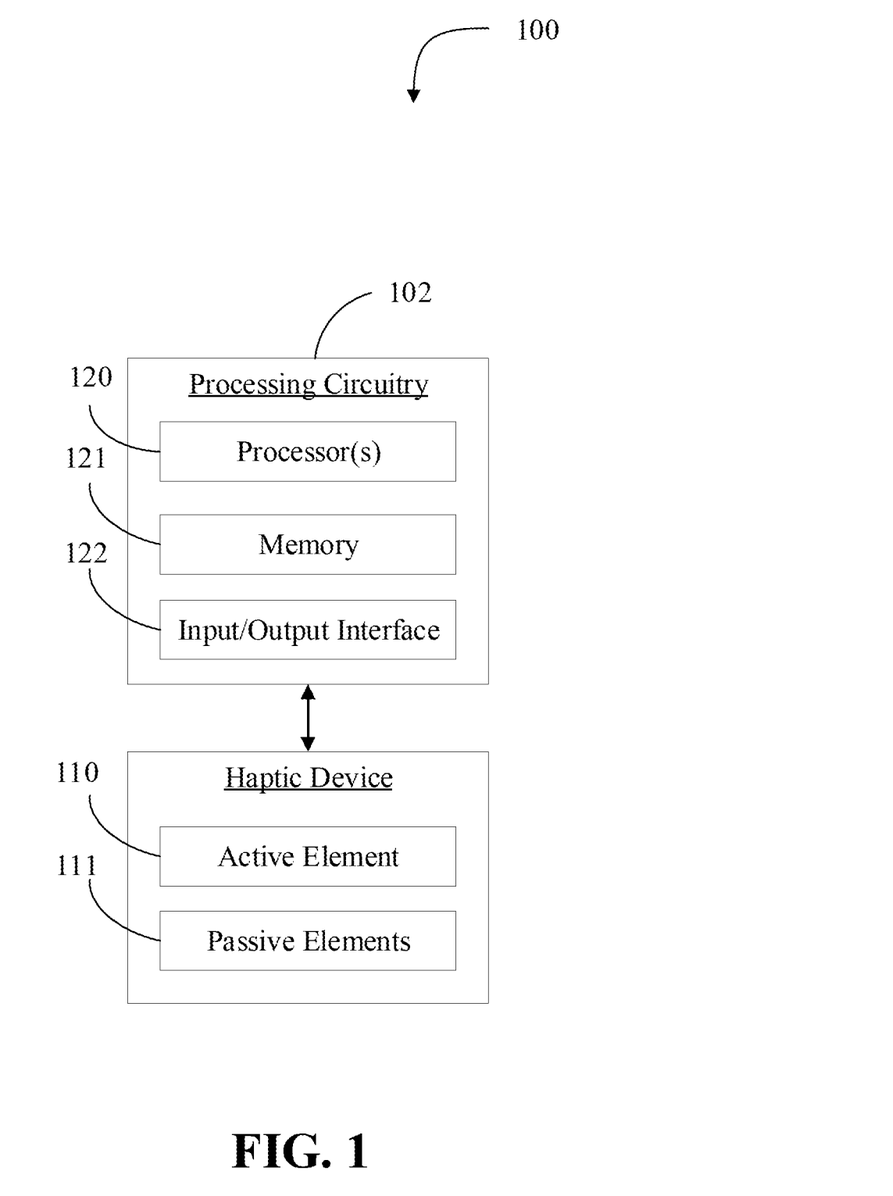
FIG. 1 is a block diagram of a haptic system in accordance with an illustrative embodiment.

Referring now to FIG. 1, a block diagram of a haptic system 100 is shown. The haptic system may include a haptic device 101, and processing circuitry 102. The haptic device 101 includes an active element 110 and multiple passive elements 111. In some embodiments, the active element 110 may include one or more voice coils, solenoids, motors, piezo actuators, electroactive polymers, or electrostatic actuators that are configured to provide vibrations or acoustic energy (e.g., ultra sound energy) at various frequencies. The multiple passive elements 111 are electrically and/or mechanically coupled to the active element 110. Each of the multiple passive elements 111 has a respective response to waves or energy transmitted by the active element 110. The passive elements 111 are configured to create a haptic effect at their respective locations away from the active element in response to the waves. In some embodiments, the respective response is a response to receiving a wave at a respective resonant frequency. That is, in some embodiments, each of the passive elements 111 is designed to have a unique or different resonant frequency from one or more of the other passive elements 111. The active element 110 may then transmit a wave having a particular frequency and if that particular frequency is at a resonant frequency of one or more of the passive elements 111, then the one or more passive elements 111 may begin to resonate. In some embodiments, the resonation of the one or more passive elements 111 causes a mass within the one or more passive elements to resonate (e.g., vibrate) in a particular pattern relative to the haptic device 101 that causes a haptic effect. In some embodiments, the haptic device may include more than one active element 110 that are each positioned at different locations on the haptic device 101 and each coupled to each of the multiple passive elements 111. In some embodiments, the more than one active elements 110 may both emit or transmit signals that are configured to constructively or destructively interfere with one another in order to create a more focused signal that may be received by one or more of the passive elements 111 (e.g., and thereby a more focused haptic effect).

The processing circuitry 102 may include a processor 120, a memory 121, and an input/output interface 122. In some embodiments the processing circuitry 102 may be integrated with various electronic devices. For example, in some embodiments, the processing circuitry 102 may be integrated with a wearable device such as a head worn display, smart watch, wearable goggles, or wearable glasses. In some embodiments, the processing circuitry 102 may be integrated with a gaming console, personal computer, server system, or other computational device. In some embodiments, the processing circuitry 102 may also include one or more processors, application specific integrated circuit (ASICs), or circuitry that are integrated with the active element 110 and are designed to cause or assist with the haptic device 101 in performing any of the steps, operations, processes, or methods described herein.

The processing circuitry 102 may include one or more circuits, processors 120, and/or hardware components. The processing circuitry 102 may implement any logic, functions or instructions to perform any of the operations described herein. The processing circuitry 102 can include memory 121 of any type and form that is configured to store executable instructions that are executable by any of the circuits, processors or hardware components. The executable instructions may be of any type including applications, programs, services, tasks, scripts, libraries processes and/or firmware. In some embodiments, the memory 121 may include a non-transitory computable readable medium that is coupled to the processor 120 and stores one or more executable instructions that are configured to cause, when executed by the processor 120, the processor 120 to perform or implement any of the steps, operations, processes, or methods described herein. In some embodiments, the memory 121 is configured to also store, within a database, information regarding the localized position of each of the passive elements 111 on the haptic device 101 along with the respective responses (e.g., resonant frequencies) of each of the passive elements 111.

In some embodiments, input/output interface 122 of the processing circuitry 102 is configured to allow the processing circuitry 102 to communicate with the haptic device 101 and other devices. In some embodiments, the input/output interface 122 may be configured to allow for a physical connection (e.g., wired or other physical electrical connection) between the processing circuitry 102 and the haptic device 101. In some embodiments, the input/output interface 122 may include a wireless interface that is configured to allow wireless communication between the haptic device 101 (e.g., an ASIC or processor on the haptic device 101 connected to the active element 110 or directly to the active element) and the processing circuitry 102. The wireless communication may include a Bluetooth, wireless local area network (WLAN) connection, radio frequency identification (RFID) connection, or other types of wireless connections. In some embodiments, the input/output interface 122 also allows the processing circuitry 102 to connect to the internet (e.g., either via a wired or wireless connection). In some embodiments, the input/output interface 122 also allows the processing circuitry 102 to connect to other devices such as a display, audio system, multiple haptic devices 101, gaming controller, or other devices that may affect the intended stimulation that is to be delivered by the haptic device 101.

It should be noted that various other components can be included in haptic system 100 that are not shown for sake of clarity of the present embodiments. These can include various power and/or signal conditioning components such as amplifiers, equalizers, etc. Such additional components can be included in either haptic device 101 or processing circuitry 102 as appropriate for the particular embodiment.

Figure 2:
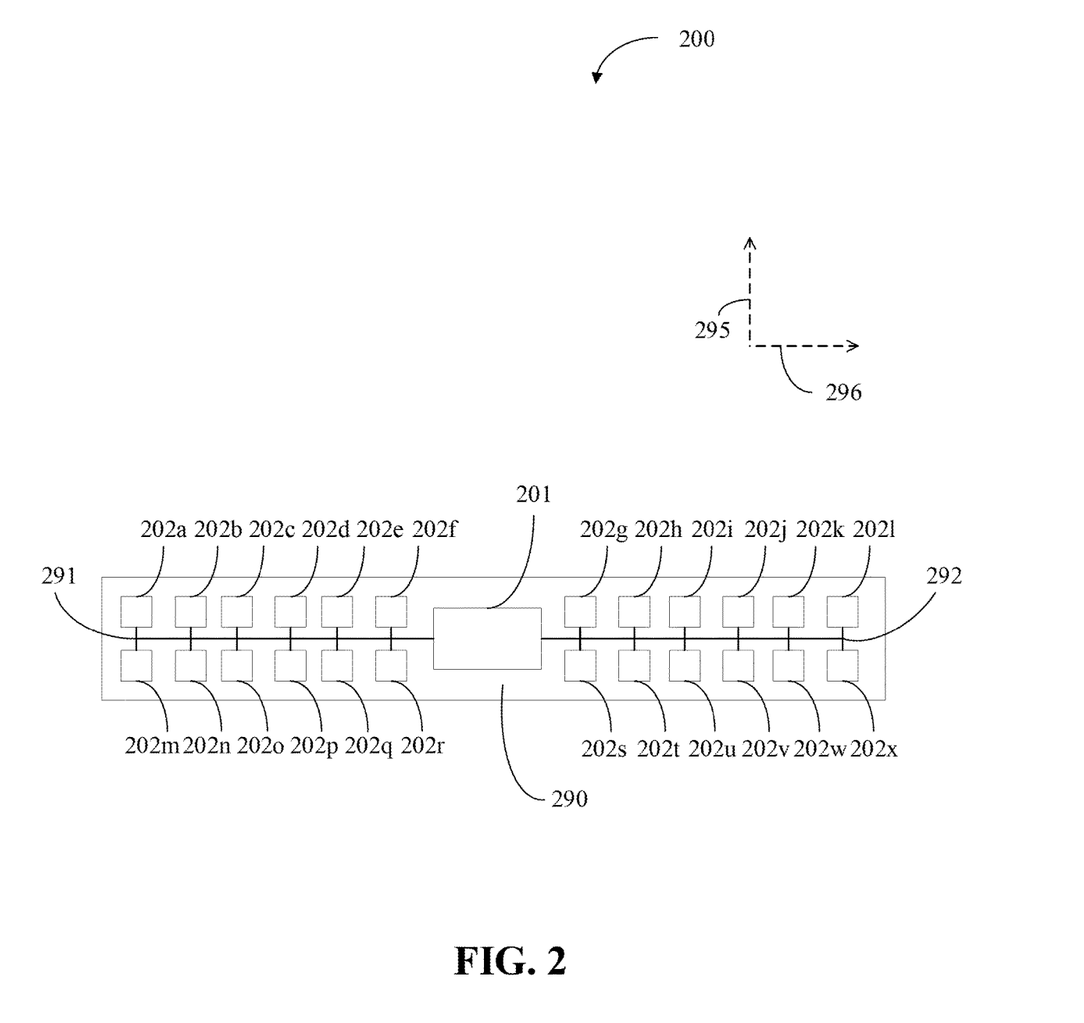
FIG. 2 is a block schematic diagram of a haptic device in accordance with an illustrative embodiment.

Referring now to FIG. 2, a block schematic diagram of a haptic device 200 is shown in accordance with an illustrative embodiment. The haptic device 200 may be similar to, or implemented as, the haptic device 101 described in reference to FIG. 1. The haptic device 200 includes an active element 201 and multiple (e.g., a plurality of) passive elements 202a-x. In some embodiments, the multiple passive elements 202a-x may include more or fewer passive elements 202a-x. In some embodiments, the multiple passive elements 202a-x may be arranged in different configurations along the haptic device 200. In some embodiments, the haptic device 200 may include additional active elements 201.

The haptic device 200 also includes a substrate 290 that the active element 201 and the multiple passive elements 202a-x are affixed to or disposed on. In some embodiments, the substrate 290 is an elastic material. In some embodiments, the substrate 290 is composed of elastic material, plastic, nonconductive alloys, cloth, cotton, polyester, or a combination thereof. In some embodiments, the haptic device 200 (e.g., and thereby the substrate 290) is in the shape or form of glove that is configured to be house a hand of the user. In some embodiments, the haptic device 200 (e.g., and thereby the substrate 290) is in the shape or form of a sock that is configured to be house a foot of the user. In some embodiments, the haptic device 200 (e.g., and thereby the substrate 290) is in the shape or form of a wrist or arm band that is configured to secure to a wrist or arm of a user. In some embodiments, the haptic device 200 is in the shape of any device that is intended to provide haptic sensations to particular areas of the human body. In some embodiments, the multiple passive elements 202a-x may be arranged in different configurations along the substrate 290. For example, each passive element 202a-x may be oriented or designed to provide different haptic sensations to different portions of a hand of the user when the haptic device 200 (e.g., and thereby the substrate 290) is in the form of a glove.

The active element 201 and the multiple passive elements 202a-x are coupled to each other by connections 291 and 292. In some embodiments, each of the multiple passive elements 202a-x may have a separate respective connection to the active element 201 or an active element. In some embodiments, one or more passive elements 202a-x may be connected to the active element 201 via a shared connection 291 or 292. In some embodiments, the connections 291 or 292 may include an elastic waveguide, wire, or other electrically and/or mechanically conductive connection.

In some embodiments, the connections 291 and 292 include a waveguide that is configured to deliver a wave (e.g., acoustic wave or vibrations) to the passive elements 202a-x without interfering with a haptic effect of the haptic device 200. In some embodiments, the waveguide is a waveguide that exhibits a refractive index that is higher than the refractive index of atmospheric air and is configured to transmit vibrations, acoustic energy, and/or ultrasounds. That is, in some embodiments, the waveguide is disposed on or within the substrate (e.g., elastic substrate) 290 such that vibrations or acoustic energy from the waveguide are not felt by or transmitted to the user. In some embodiments, the connections 291 and 292 are transmitting elements. In some embodiments, the substrate 290 acts as a ground for the multiple passive elements 202a-x (e.g., for the masses or moving parts of the multiple passive elements).

The active element 201 is configured to generate or provide waves or energy at various frequencies to one or more of the multiple passive elements 202a-x via connections 291 or 292. Each of the multiple passive elements 202a-x are configured to provide a response that may cause a haptic effect based on the characteristics of the wave or signal provided from the active element 201. In some embodiments, each of the multiple passive elements 202a-x has a resonant frequency that causes a mass (or moving element) to move or vibrate in a particular orientation on the haptic device 200 (e.g., or substrate 290) in response to receiving a wave or signal that is at the resonant frequency of the respective passive element. Thus, the haptic device 200 is able to cause particular passive elements to vibrate more than other passive elements by transmitting waves at different frequencies. Further, the haptic device 200 is able to selectively localize haptic effects by transmitting particular waves at particular frequencies to that cause particular passive elements at a known location of the haptic device 200 to resonate. The haptic effect is created due to the resonant frequency causing particular passive elements to vibrate more intensely than the passive elements that have different resonant frequencies. For example, in an embodiment where the haptic device 200 is implemented as a wearable device (e.g., a glove), the respective locations of each of the multiple passive elements 202a-x are configured to align with respective locations of a person wearing the wearable device and the haptic device 200 is able to provide haptic sensations to the respective locations of the person based on the known resonant frequency of each respective passive element.

In some embodiments, the particular orientation in which a mass of a respective passive element vibrates is dependent on the design of the passive element. A different haptic effect may be sensed by the user depending on the particular orientation or design of respective passive elements being resonated. For example, one passive element may have springs of different strengths in various directions that make the oscillation asymmetrical. For example, in some embodiments, the asymmetrical vibration may cause the user to feel or experience a pulling sensation. In some embodiments, one or more of the multiple passive elements 202a-x may be configured to dampen specific frequencies.

In some embodiments, the resonant parameters of the resonator could be modified. For example, the resonators could be stopped or dampened either selectively or in total using an electrical, mechanical, magnetically, or electromechanical system to improve the spatial selectivity or to change the generated signals. That is, in some embodiments, the mass of a particular passive element may be modified through a tube that either pumps liquid in or out of the mass, or the mass may contain a magnet or a diamagnetic material that stops the mass in one position until a large enough vibration or electrical signal is received that overcomes the magnetic force of the mass.

In some embodiments, the masses of some of the multiple passive elements are configured to have particular orientations that cause the mass to vibrate vertically (e.g., along axis 295), horizontally (e.g., along axis 296), along an axis orthogonal to the substrate 290 (e.g., an axis coming out of the page in FIG. 2), or along an angle therebetween. In some embodiments, two or more of the multiple passive elements 202a-x may have the same respective resonant frequency and are oriented in different positions. For example, a wave or signal transmitted at the resonant frequency may cause the two or more multiple passive elements 202a-x to resonate (or vibrate) respective masses along different angles relative to the substrate 290. In this example, the haptic device 200 may resonate two or more of the multiple passive elements 202a-x simultaneously in order to improve selectivity in the location of the haptic effect, produce more intense vibrations, produce vibrations in different directions, and/or combine different haptic sensations. The haptic effect is created due to the resonant frequency causing particular passive elements to vibrate more intensely than the passive elements that have different resonant frequencies. In some embodiments, two or more of the multiple passive elements 202a-x may be located at or near the same position on the haptic device 200, be oriented to resonate in different directions or patterns, and each have different resonant frequencies. In this way, the two or more multiple passive elements 202a-x may be resonated separately or at the same time to create different haptic effects (e.g., different vibration sensations). For example, a single one of the two or more multiple passive elements 202a-x may be resonated to create a first vibratory haptic effect at a first location and more than one of the two or more multiple passive elements 202a-x may be resonated to create a more or less intense second vibratory haptic effect at the first location. Thus, the two or more multiple passive elements 202a-x may allow for a wider spectrum of haptic effects to be generated at particular locations.

In some embodiments, one or more of the multiple passive elements 202a-x may have one or multiple modes. That is, in some embodiments, one or more of the multiple passive elements 202a-x may be configured to resonate at multiple different frequencies with each of the different frequencies causing the respective passive element to have a different response. For example, a first frequency received by a respective passive element may cause a mass to resonate or vibrate along axis 295 and a second frequency received by the respective passive element may cause a second mass (or the mass) to twist about the axis 295. In this way, one or more passive elements 202a-x may each be configured to generate multiple different haptic effects at near or the same location on the haptic device 200.

Figure 3:
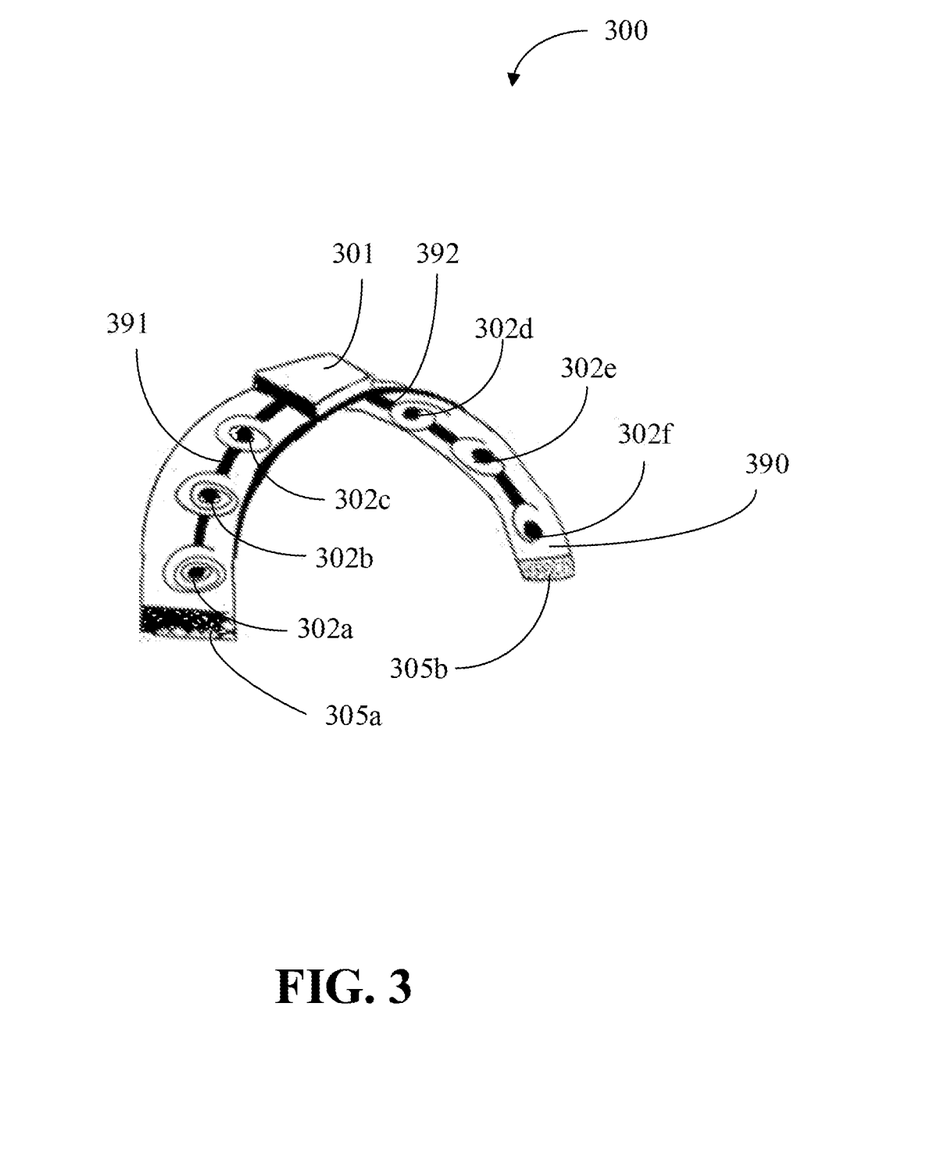
FIG. 3 is a haptic device in accordance with an illustrative embodiment.

Referring now to FIG. 3, an example haptic device 300 is shown in accordance with an illustrative embodiment. In some embodiments, the haptic device 300 is in the form of a wristband with similar elements to the haptic devices 101 and 200 described above. The haptic device 300 includes an active element 301 and multiple passive elements 302a-f. The haptic device 300 may include a transceiver that is configured to wirelessly communicate with the processing circuitry 102. In some embodiments, the active element 301 includes an oscillator that is attached to or a part of an integrated circuit (e.g., ASIC) within a housing of the active element and configured to generate waves or vibrations having different frequencies. In some embodiments, the haptic device 300 includes a substrate 390 that is in the form of a wristband. The substrate 390 in the form of the wristband may be flexible and include a latching device at a first end 305a and a second end 305b such that the haptic device may be secured to a wrist of a user.

The multiple passive elements 302a-f are coupled to the active element via connections 391 and 392. In some embodiments, a first set 302a-c of the multiple passive elements are connected to the active element 301 via a first connection 391 and a second set 302d-f are connected to the active element 301 via a second connection 392. In some embodiments, the first and second connections 391 and 392 carry the same wave or energy from the active element 301. That is, the active element 301 is configured to generate a wave or energy having particular frequency and transmit the wave or energy via both of the connections 391 and 392. In some embodiments, the first connection 391 is configured to carry a first wave or energy from the active element 301 and the second connection is configured to carry a second wave or energy from the active element 301. In some embodiments, the first and second connections 391 and 392 are waveguides configured to carry energy, or waves to the respective passive elements.

The multiple passive elements 302a-f may be resonators (e.g., local resonators) each having a resonant frequency. In some embodiments, one or more of the multiple passive elements 302a-f are periodic local microstructures. In some embodiments, one or more of the multiple passive elements 302a-f include acoustic/elastic metamaterials. In some embodiments, the acoustic/elastic metamaterials are single phase or multiphase metamaterials. In some embodiments, the multiple passive elements 302a-f include a mass (or moving portion) and an elastic element (e.g., spring or connection to an elastic substrate). The mass is configured to vibrate or move in response to the respective passive element receiving a wave at or near a resonant frequency of the passive element in order to create a haptic effect. In some embodiments, the multiple passive elements 302a-f are oriented in different directions to create different haptic stimulations in response to receiving a wave or signal at or near a resonant frequency of the respective passive element.

In some embodiments, one or more of the multiple passive elements 302a-f are configured to activate or resonate in response to sensing acoustic activity at the resonant frequency. In some embodiments, the acoustic energy may be present around the haptic device 300 and sensed by one or more of the multiple passive elements 302a-f. In some embodiments, the acoustic energy may be generated by one or more speakers surrounding the user. In some embodiments, the speakers generating the acoustic energy may be connected to the processing circuitry 102.

In some embodiments, each of the multiple passive elements 302a-f has a resonant frequency that is different from the other passive elements 302a-f. The active element 301 may create haptic stimulation that can be sensed by a user at localized, targeted area (e.g., the bottom of the wrist) by generating a wave or vibration that has a frequency at or near the resonant frequency of the respective passive element (e.g., passive element 302a and/or 302f) that is configured to align with the targeted area. In some embodiments, one of the multiple passive elements 302a-f may have the same resonant frequency of one or more other multiple passive elements 302a-f in order to create different haptic stimulation (e.g., more intense vibration) or a more broad stimulation.

Figure 4:
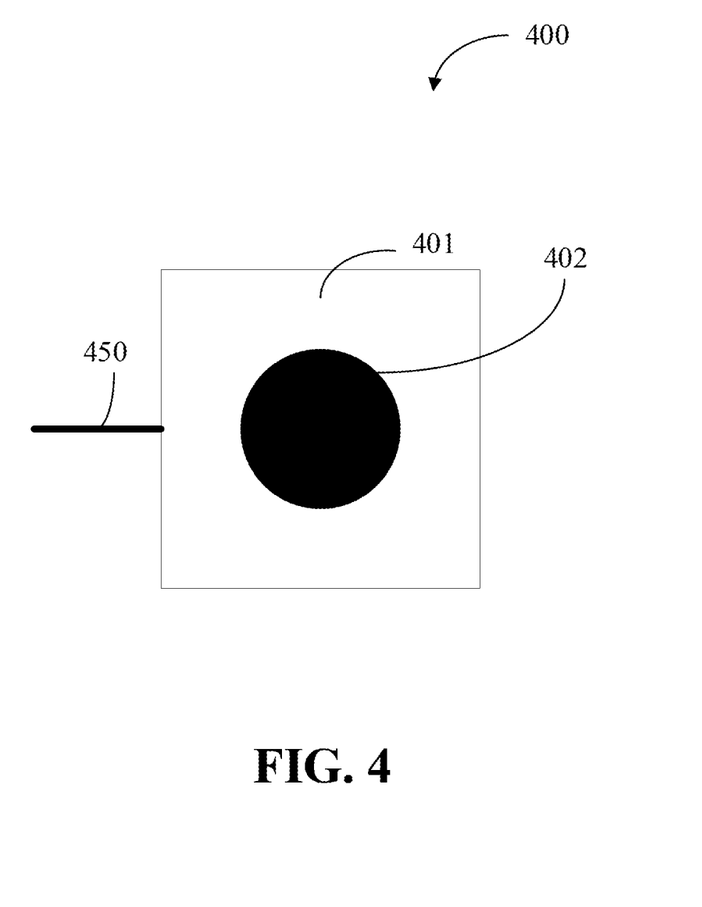
FIG. 4 is a top view of a passive element in accordance with an illustrative embodiment.

Referring now to FIG. 4, a top view of a passive element 400 is shown in accordance with an illustrative embodiment. It is to be appreciated that FIG. 4 is meant by way of example only and that in some embodiments other configurations or designs of passive elements 400 are possible. For example, in some embodiments, the active element may be an element that is configured to generate ultrasound and the passive element may include a modulator that is configured to transfer high frequency signals into lower frequency signals. In some embodiments, the modulator may include lumped parameters (e.g., mass, spring, housing, etc.) and/or metasurfaces. In some embodiments, the skin of a user holding or affixed to the haptic device may be used as a modulator.

The passive element 400 includes an elastic substrate 401, and a mass 402. In some embodiments, the mass 402 is mounted directly to the elastic substrate 401. In some embodiments, the mass 402 is mounted to the elastic substrate 401 via one or more springs. In some embodiments, the mass 402 includes a housing around the mass 402. The passive element 400 also includes a transmitting component 450 that is positioned near the mass 402 such that waves from the transmitting component 450 are sensed by the mass 402. In some embodiments, the transmitting component 450 is a waveguide that is made from metamaterials that exhibit a negative refractive index for acoustic and pressure waves.

The transmitting component 450 is connected to an active element that is configured to generate vibration or acoustic waves (e.g., energy) and transmit the vibration or acoustic wave to the transmitting component 450. In some embodiments, the vibration or acoustic waves transmitted by the transmitting component 450 may be at a various frequencies. The vibration or acoustic waves may cause the mass 402 to vibrate intensely (e.g., intense enough to be sensed by a user) when the vibration or acoustic waves transmitted by the transmitting component 450 are at or near a resonant frequency of the passive element 400. The vibrating mass 402 may then be sensed by the user through the elastic substrate 401. In some embodiments, the elastic substrate 401 may have a portion removed and the mass may be connected to elastic substrate 401 via one or more springs such that when the mass vibrates the mass directly impacts the skin of a user through the portion of the elastic substrate that was removed.

Figure 5:
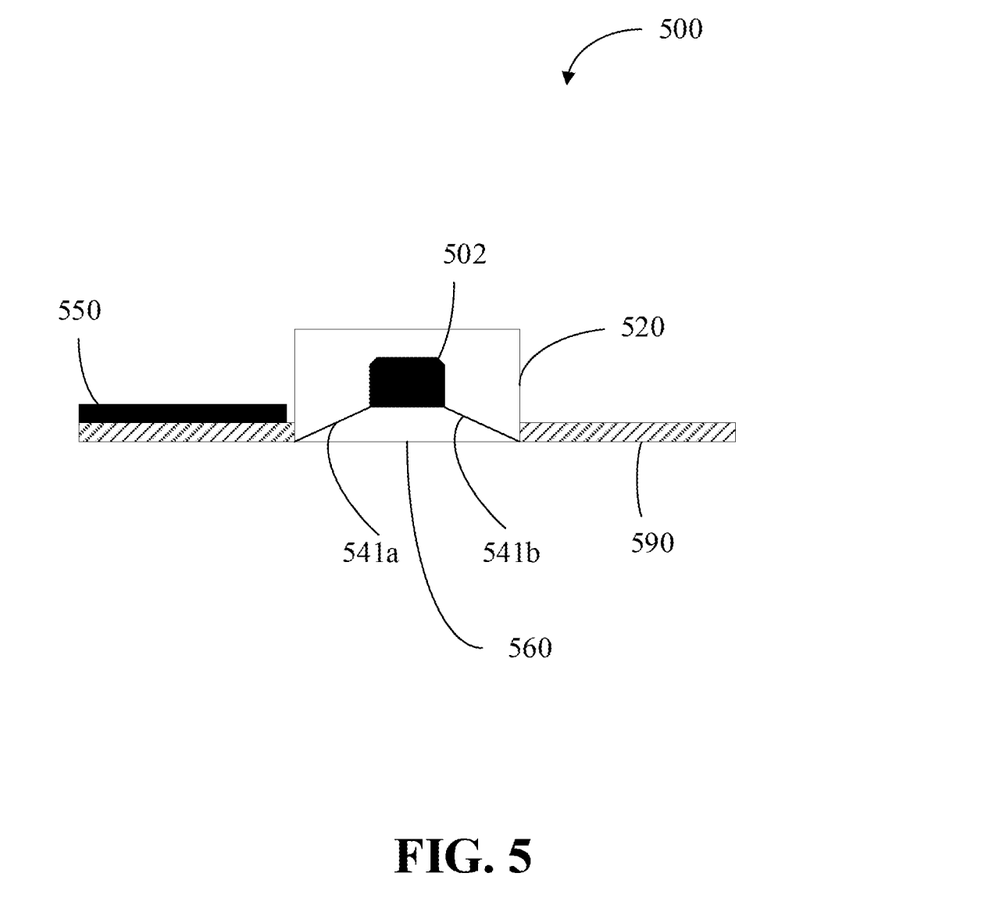
FIG. 5 is a side cutaway view of a passive element in accordance with an illustrative embodiment.

Referring now to FIG. 5, a side cutaway view of a passive element 500 is shown in accordance with an illustrative embodiment. The passive element 500 includes a mass 502, a grounding portion (e.g., an elastic substrate) 590, a housing 520, a first spring 541a, a second spring 541b, and a transmitting component 550. In some embodiments, the mass 502 may be suspended above a first surface 560 of the housing 520 by the first spring 541a and second spring 542b. The transmitting component 550 is similar to the transmitting component 450 of FIG. 4. That is, the transmitting component 550 is configured to carry energy (e.g., vibrations or acoustic energy) and is terminated near the housing 520 such that the vibrations or acoustic energy is transmitted to the housing 520 and thereby the mass 502. Similar to above, when the vibrations or acoustic energy carried by the transmitting component 550 are near the resonant frequency of the housing 520 and the mass 502, the mass 502 begins to move in an oscillatory manner. The movement of the mass 502 may then be sensed by a user that has the passive element 500 near his/her body. In some embodiments, the mass 502 oscillates sufficiently to cause the mass to impact one or more sides of the housing 520 such that a haptic effect is created by the user being in contact with the housing 520. In some embodiments, for example when the first and second springs 541a and 541b are strong (e.g., have a large k value), the oscillations of the mass 502 may be sensed (e.g., haptic effect created) by the user by the springs moving the housing 520 (e.g., enclosure).

In some embodiments, the passive element 500 may not include a full housing 520; rather, the passive element 500 may include the first surface 560. In some embodiments, the haptic effect may be sensed by the user via the oscillations or impacts of the mass 502 on the first surface 560. In some embodiments, the waveguide may be electrically conductive and connected to a first portion (e.g., the first spring 541a) such that an electrical signal may be transmitted to and through the first spring 541, mass 502, and back to ground (e.g., via the second spring 541b that is connected to ground on one end). In some embodiments, an electrical signal from the active element may be transmitted to the passive element and cause the passive element (e.g., mass of the passive element) to resonate when the electrical signal is at a particular frequency.

Figure 6:
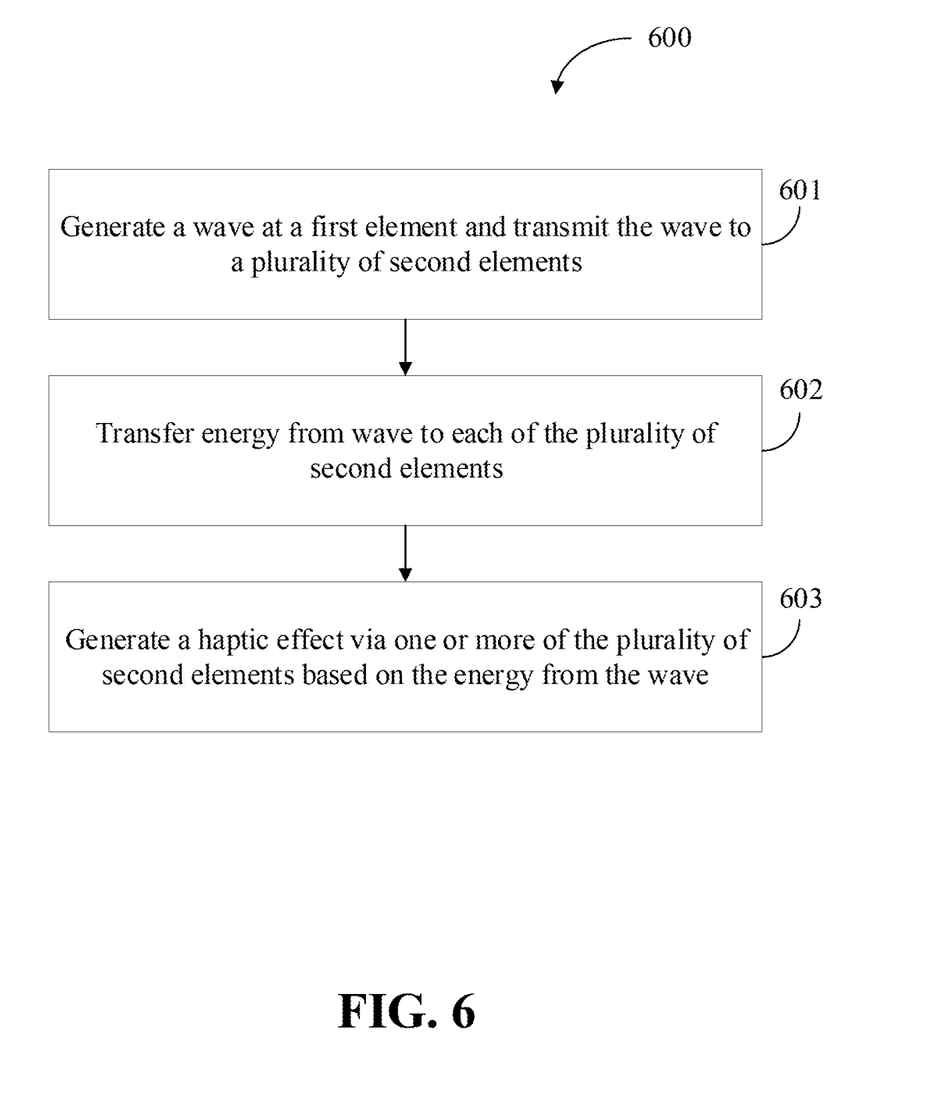
FIG. 6 is a flow diagram of a method of providing haptic feedback in accordance with an illustrative embodiment.

Referring now to FIG. 6, a flow diagram of a method 600 of providing haptic feedback is shown in accordance with an illustrative embodiment. In a process 601, an active element generates a wave and transmits the wave to a transmitting element. In some embodiments, the wave includes acoustic energy. In some embodiments, the wave is a vibration wave. In some embodiments, the wave has particular frequencies. In some embodiments, the active element generates the wave using an oscillator that is connected to a microcontroller or other processing device.

In a process 602, energy from the wave is transferred to multiple passive elements via the transmitting element. In some embodiments, the passive element is a resonator that includes an elastic element (e.g., spring or elastic substrate) and a mass (or moving part). In some embodiments, the transmitting element is a waveguide that is created from acoustic metamaterials having a higher refractive index than a refractive index of atmospheric air. The transmitting element is configured to carry the wave to or near one or more passive elements such that energy from the wave is transmitted to the one or more passive elements. In some embodiments, the transmitting element is disposed on an elastic element such that vibrations or acoustic energy from the wave is not sensed by a user wearing the haptic device.

In a process 603, a haptic effect is created by one or more of the passive elements in response to receiving the energy from the wave. In some embodiments, energy transferred from the wave is used to resonate one or more of the passive elements that have a resonant frequency at or near the frequency of the wave. The resonation of the one or more passive elements causes a vibrating or impact sensation based on the design of the one or more passive elements. For example, in some embodiments, a mass of the one or more resonating passive elements makes contact with the skin through the elastic substrate in order to generate the haptic effect. In some embodiments, the mass or oscillating portion of the one or more resonating passive elements makes direct contact with the skin to produce the haptic effect. In some embodiments, the mass or oscillating portion of the one or more resonating passive elements is contained within an enclosure (e.g., a housing) that is configured to be in contact with the skin of a user and the vibration or impact of the mass within the enclosure create the haptic effect.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A haptic device comprising:
   an active element; and
   a plurality of passive elements coupled to the active element, each passive element having a respective response to a wave transmitted by the active element, and configured to cause a respective haptic effect at a respective location away from the active element.

2. The apparatus of claim 1, wherein the respective response is a resonant frequency.

3. The apparatus of claim 2, wherein when the active element transmits the wave at one of the resonant frequencies of the passive elements, the associated passive element is configured to vibrate more than other of the passive elements.

4. The apparatus of claim 3, further comprising a waveguide that is configured to deliver the wave to the passive elements without interfering with the haptic effect.

5. The apparatus of claim 1, wherein each passive element is further configured in a respective orientation for providing the respective haptic effect.

6. The apparatus of claim 1, wherein the haptic device comprises a wearable device, and the respective locations of the passive elements are configured to be respective locations of a person wearing the wearable device.

7. The apparatus of claim 6, wherein the wearable device comprises a glove.

8. An apparatus comprising:
   an active element; and
   a plurality of resonators coupled to the active element, each resonator having a respective resonant frequency, wherein the active element is configured to transmit energy to the resonators at a selected one of each of the plurality of resonant frequencies.

9. The apparatus of claim 8, wherein the resonators each comprise a moving mass mounted on an elastic substrate.

10. The apparatus of claim 9, wherein in response to the energy having the resonant frequency, the elastic substrate of the associated resonator allows the moving mass to oscillate.

11. The apparatus of claim 10, wherein the resonators each further comprise a surface, and are configured such that when the moving mass oscillates, it makes contact with the surface.

12. The apparatus of claim 9, wherein the elastic substrate comprises a spring.

13. The apparatus of claim 9, wherein the resonators each further comprise an enclosure, and are configured such that when the moving mass oscillates, the enclosure vibrates.

14. The apparatus of claim 9, wherein the elastic substrate is attached to a grounding portion.

15. The apparatus of claim 8, wherein two of the resonators have the same respective resonant frequency, and wherein the two resonators are configured to vibrate in different directions in response to the energy having the same respective resonant frequency.

16. An apparatus comprising:
    an active element;
    a plurality of passive elements; and
    a waveguide for conducting energy from the active element to all the plurality of passive elements, wherein the active element is configured to selectively activate one or more of the plurality of passive elements via the waveguide by adjusting a parameter of the energy.

17. The apparatus of claim 16, wherein each of the passive elements has a respective resonant frequency, and wherein the parameter comprises a frequency of the energy.

18. The apparatus of claim 17, wherein the respective resonant frequency is configured to be modified using one or more of an electrical, mechanical, magnetically, or electromechanical system.

19. The apparatus of claim 16, wherein the energy comprises vibration.

20. The apparatus of claim 16, wherein the energy comprises acoustic energy.

* * * * *